United States Patent
Kapetanovic et al.

(10) Patent No.: US 11,197,311 B2
(45) Date of Patent: Dec. 7, 2021

(54) INTERFERENCE MITIGATION FOR NARROWBAND DEVICES IN WIDEBAND ENVIRONMENTS

(71) Applicant: Telefonaktiebolaget LM Ericsson (publ), Stockholm (SE)

(72) Inventors: Dzevdan Kapetanovic, Lund (SE); Thomas Nilsson, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 257 days.

(21) Appl. No.: 16/479,867

(22) PCT Filed: Mar. 1, 2017

(86) PCT No.: PCT/EP2017/054787
§ 371 (c)(1),
(2) Date: Jul. 22, 2019

(87) PCT Pub. No.: WO2018/157925
PCT Pub. Date: Sep. 7, 2018

(65) Prior Publication Data
US 2021/0307034 A1 Sep. 30, 2021

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/1896* (2013.01); *H04W 72/0426* (2013.01);
(Continued)

(58) Field of Classification Search
CPC ......... H04W 72/1268; H04W 72/0446; H04W 72/082; H04W 72/0426; H04W 72/0453; H04L 1/1896
See application file for complete search history.

(56) References Cited

U.S. PATENT DOCUMENTS

| | | | | |
|---|---|---|---|---|
| 2011/0222398 A1* | 9/2011 | Ribeiro | ............. | H04W 74/0816 370/230 |
| 2011/0310795 A1* | 12/2011 | Andersson | ........ | H04W 72/1231 370/328 |
| 2013/0210447 A1* | 8/2013 | Moe | ...................... | H04W 28/16 455/453 |

(Continued)

OTHER PUBLICATIONS

Gong, Michelle, "RTS/CTS Operation for Wider Bandwidth", IEEE 802.11-10/1289r2, Nov. 9, 2010, pp. 1-17.

(Continued)

*Primary Examiner* — Jael M Ulysse
(74) *Attorney, Agent, or Firm* — Sage Patent Group

(57) ABSTRACT

Methods of a wireless communication node are disclosed. The methods are for mitigating interference caused during an upcoming downlink transmission by a second wireless communication access point to a first wireless communication station by one or more second wireless communication stations served by a first (neighboring) wireless communication access point, wherein the first wireless communication station is served by the second wireless communication access point. The one or more second wireless communication stations are adapted to communicate using a second frequency interval and the first wireless communication station is adapted to communicate using a first (smaller) frequency interval, comprised within the second frequency interval. In one aspect, a method of the first wireless communication access point comprises receiving (from the first wireless communication station) an indication signal indicative of the upcoming downlink transmission.

21 Claims, 3 Drawing Sheets

(51) Int. Cl.
  *H04W 72/04*   (2009.01)
  *H04W 72/08*   (2009.01)

(52) U.S. Cl.
  CPC .............. *H04W 72/0446* (2013.01); *H04W 72/0453* (2013.01); *H04W 72/082* (2013.01); *H04W 72/1273* (2013.01)

(56) References Cited

U.S. PATENT DOCUMENTS

| | | | |
|---|---|---|---|
| 2014/0018115 A1* | 1/2014 | Zhuang | H04B 7/024 455/501 |
| 2015/0030098 A1* | 1/2015 | Ljung | H04B 1/525 375/285 |
| 2015/0055613 A1* | 2/2015 | Palanki | H04L 5/0073 370/329 |
| 2015/0111610 A1* | 4/2015 | Hwang | H04W 72/1215 455/553.1 |
| 2015/0201419 A1 | 7/2015 | Zhou et al. | |
| 2016/0037531 A1 | 2/2016 | Lu et al. | |
| 2016/0081120 A1* | 3/2016 | Kong | H04W 74/0816 370/329 |
| 2016/0301457 A1* | 10/2016 | Liang | H04W 52/244 |

OTHER PUBLICATIONS

Nan, Li, et al., "RTS&CTS Exchange in wideband transmission", IEEE 802.11-10/1066r2, Sep. 15, 2010, pp. 1-8.

* cited by examiner

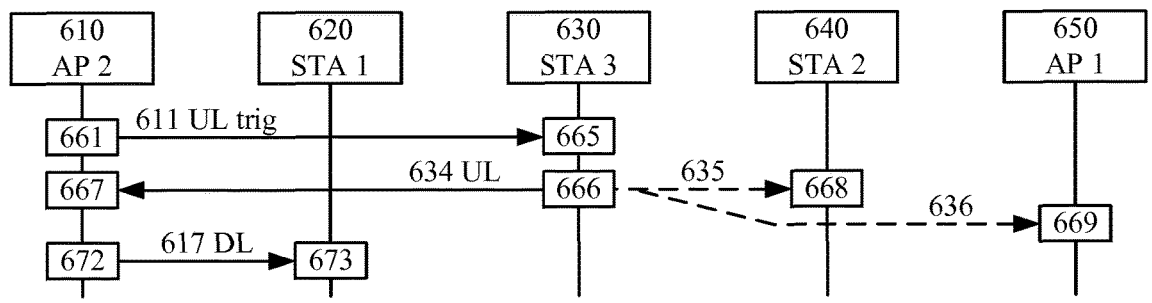
FIG. 6
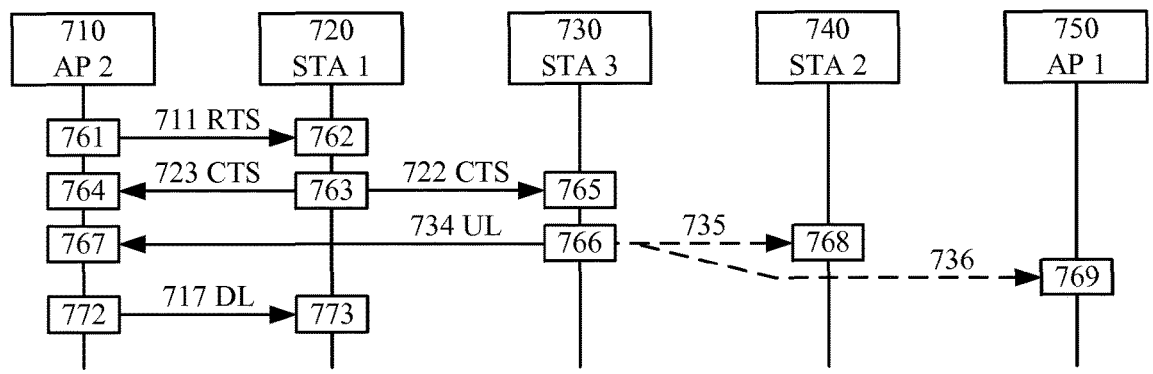
FIG. 7
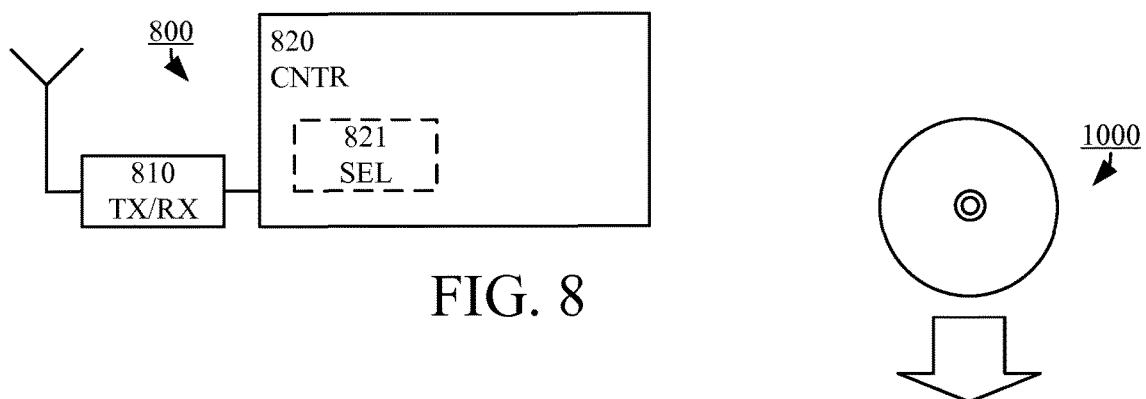
FIG. 8
FIG. 9
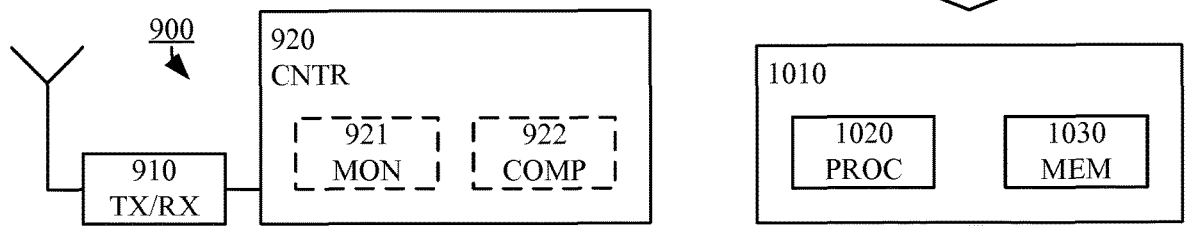
FIG. 10

INTERFERENCE MITIGATION FOR NARROWBAND DEVICES IN WIDEBAND ENVIRONMENTS

TECHNICAL FIELD

The present invention relates generally to the field of wireless communication. More particularly, it relates to interference mitigation for narrowband devices operating in wideband environments.

BACKGROUND

The power consumption of a wireless communication device (also referred to herein as a device) typically depends on the bandwidth it supports. Narrowband (NB) devices are therefore typically preferred over wideband (WB) devices for applications with requirements regarding low power consumption, e.g. in association with Internet of Things (IoT). Wireless communication standards which support high data rates (e.g. using wideband communication) are therefore typically not well suited for IoT. Hence, several communication standardization development organizations (e.g. 3GPP (Third Generation Partnership Project) and IEEE (Institute of Electrical and Electronics Engineers)) consider special IoT-associated approaches that are adapted to co-exist with the high data rate wireless communication they usually support, i.e. narrowband devices in wideband environments. Typically, IoT-related requirements include one or more of low cost, low power consumption, and long range, as well as relaxed requirements regarding data rate (supporting low peak data rate and/or low average data rate suffices).

Listen-Before-Talk (LBT) techniques are used in many wireless communication systems to avoid collisions and/or severe interference between communications related to different devices. For example, The Medium Access Control (MAC) in IEEE 802.11 is based on an LBT-technique denoted Carrier Sense Multiple Access with Collision Avoidance (CSMA/CA), which is denoted Clear Channel Assessment (CCA) in the context of IEEE802.11. CCA uses physical carrier sensing, but approaches for virtual carrier sensing may be used as well.

The physical carrier sensing resides in the physical layer (PHY) and applies both energy detection and signal detection. The energy detection relates to comparing received energy to a threshold. The signal detection relates to preamble decoding of a transmitted packet, including extraction of a length field comprised in the preamble and indicating the amount of time the transmitted packet will occupy the medium. A channel is determined to be idle only when both energy detection and signal detection so indicate.

The virtual carrier sensing resides in the MAC layer and uses a so-called Network Allocation Vector (NAV). Setting of the NAV relates to a duration field comprised in the transmitted packet preamble, indicating the amount of time that the medium will be considered busy after the transmission of the packet is finished, i.e. the duration of the current transmission and the additional time.

During the time of the packet transmission and during the time when NAV is set, there is no need for the device to engage in further carrier sensing, and power can be saved by turning of parts of the device (e.g. radio parts).

IEEE802.11 will be used herein as an illustrative example, and notations may be consequently adapted without being intended as limiting. For example, the notations associated with IEEE802.11 regarding (wireless communication) station (STA) and (wireless communication) access point (AP) will be used interchangeably with (wireless communication) device and (wireless communication) network node.

One problem generally encountered in systems employing LBT-techniques is the hidden node problem. This problem is generally well known in the art and will merely be briefly exemplified herein, with reference to FIGS. 1 and 2, in the context of co-existence between wideband and narrowband devices.

FIG. 1 is a schematic illustration of an example scenario where problems related to a hidden node may occur. A first access point (AP 1) 150 serves a wideband device (STA 2) 140, and a second access point (AP 2) 110 serves a wideband device (STA 3) 130 and a narrowband device (STA 1) 120. AP 1 is only adapted to serve wideband devices and the wideband coverage area is shown as dashed circle 170. AP 2 is adapted to serve both wideband and narrowband devices and the wideband and narrowband coverage areas are shown as dashed circle 160 and dotted circle 165, respectively. Narrowband coverage areas are typically larger than wideband coverage areas. The hidden node problem will be illustrated via a few examples of how STA 1 and STA 2 may cause interference to each other.

FIG. 2 illustrates three different situations where the hidden node problem may manifest itself. The situations are illustrated in relation to signaling involving a first access point (AP 1) 250 (compare with AP 1 150 of FIG. 1) which serves a wideband device (STA 2) 240 (compare with STA 2 140 of FIG. 1), and a second access point (AP 2) 210 (compare with AP 2 110 of FIG. 1) which serves a wideband device (STA 3) 230 (compare with STA 3 130 of FIG. 1) and a narrowband device (STA 1) 220 (compare with STA 1 120 of FIG. 1).

In the situation denoted with a) in FIG. 2, AP 2 transmits a request to send (RTS) signal relating to an upcoming transmission to STA 1. The RTS is received by STA 1 as illustrated by 211 and by STA 3 as illustrated by 212. Assuming that the RTS is designed so that it is understood by both narrowband devices (e.g. STA 1) and wideband devices (e.g. STA 3), STA 3 will (as a response to receiving the RTS 212) refrain from transmissions during the upcoming transmission from AP 2 to STA 1, at least in frequencies used for communication by STA 1.

As a response to receiving the RTS 211, STA 1 transmits a clear to send (CTS) signal to AP 2. The CTS is received by AP 2 as illustrated by 216. The CTS signal also reaches STA 2 as illustrated by 213, which would normally cause STA 2 to refrain from transmissions during the upcoming transmission from AP 2 to STA 1, at least in frequencies used for communication by STA 1. However, the CTS is transmitted as a narrowband signal since STA 1 is a narrowband device, and a narrowband CTS will typically not be understood by a wideband device such as STA 2, which is illustrated by the X 214 in part a) of FIG. 2.

Thus, despite being reached by the CTS, STA 2 may engage in uplink (UL) communication 215 which may overlap (in time and frequency) with the upcoming downlink (DL) transmission 217 by AP2 to STA 1. The interference that UL transmission by STA 2 may cause to DL reception in STA 1 is illustrated by the interfering signal (INT) 218 and the circle 219 for the victim device STA 1 in part a) of FIG. 2.

In the situation denoted with b) in FIG. 2, AP 2 transmits an uplink trigger (UL trig) signal to STA 1 as illustrated by 221. As a response to receiving the UL trigger 221, STA 1 transmits an uplink (UL) signal which is received by AP 2 as illustrated by 223.

The UL signal also reaches STA 2 as illustrated by 224 and STA 3 (not shown). If the UL preamble was understood by STA 2 and STA 3, they would refrain from transmissions during the UL transmission from STA 1 to AP 2, at least in frequencies used for communication by STA 1. However, the UL transmission 223, 224 is a narrowband signal since STA 1 is a narrowband device. Therefore, the UL preamble will typically not be understood by a wideband device such as STA 2 and STA 3. For STA 2, this is illustrated by the X 225 in part b) of FIG. 2.

Since STA 3 is served by the same access point as STA 1, there may be other possibilities than UL preamble information to silence STA 3 as needed. For example, the UL trigger may be readable also to STA 3 and may comprise information causing STA 3 to refrain from transmissions during the UL transmission from STA 1 to AP 2, at least in frequencies used for communication by STA 1. Another possibility is AP 2 reserving the medium for STA 1 UL transmissions via the RTS/CTS mechanism as illustrated in part a) of FIG. 2. Such possibilities will typically not be available for STA 2 which is served by another access point that STA 1.

Thus, despite being reached by the UL transmission 224, STA 2 may engage in uplink (UL) communication 226 which may overlap (in time and frequency) with reception at STA 1 of a downlink (DL) response 227 to the uplink transmission 223. The interference that UL transmission by STA 2 may cause to DL response reception in STA 1 is illustrated by the interfering signal (INT) 228 and the circle 229 for the victim device STA 1 in part b) of FIG. 2.

In the situation denoted with c) in FIG. 2, AP 2 transmits an uplink trigger (UL trig) signal to STA 1 as illustrated by 231. As a response to receiving the UL trigger 231, STA 1 transmits an uplink (UL) signal which is received by AP 2 as illustrated by 233.

The UL signal also reaches STA 2 as illustrated by 234 and STA 3 (not shown). As in part b), the UL preamble will typically not be understood by a wideband device such as STA 2, which is illustrated by the X 235.

Thus, despite being reached by the UL transmission 234, STA 2 may engage in uplink communication 236 (e.g. RTS or data). Reception, at STA 2, of a downlink response 237 (e.g. CTS or data) to the uplink communication 236 may then be interfered by the uplink (UL) transmission from STA 1 if they overlap (in time and frequency). The interference that UL transmission by STA 1 may cause to DL response reception in STA 2 is illustrated by the interfering signal (INT) 238 and the circle 239 for the victim device STA 2 in part c) of FIG. 2.

These examples are meant to illustrate how co-existence between NB and WB devices in is challenging. Inherently, a NB device cannot generate and/or understand WB preambles and/or WB RTS/CTS. Correspondingly, a legacy WB device cannot generate and/or understand NB preambles and/or NB RTS/CTS. These circumstances leads to aggravation of the hidden node problem since the physical and virtual carrier sensing mechanisms based on signal detection and NAV setting may not be effective. The problems may be particularly prominent when the NB device is far from its serving access point.

Therefore, there is a need for interference mitigation in relation to narrowband devices in wideband environments.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages. In this respect, various aspects will be presented which are alternative solutions to the same problem; interference mitigation for narrowband devices. One common general inventive concept comprises signaling adapted to silence, during communication of a narrowband device (e.g. STA 1) with its serving network node (e.g. AP 2), nearby wideband devices (e.g. STA 2) served by a neighboring access point (e.g. AP 1), at least in frequencies used by the narrowband device.

According to a first aspect, this is achieved by a method of a first wireless communication access point for mitigating interference caused to a first wireless communication station by one or more second wireless communication stations. The one or more second wireless communication stations are served by the first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The method comprises receiving (from the first wireless communication station) an indication signal indicative of an upcoming downlink transmission by the second wireless communication access point intended for the first wireless communication station. Transmission of the indication signal by the first wireless communication station is triggered by reception at the first wireless communication station of a request signal (from the second wireless communication access point) requesting approval for the upcoming downlink transmission.

The method also comprises transmitting (to the one or more second wireless communication stations) an instruction signal inferring the one or more second wireless communication stations to avoid uplink transmissions in the first frequency interval during the upcoming downlink transmission by the second wireless communication access point.

In various embodiments, the indication signal may be a request to send (RTS) signal or a clear to send (CTS) signal, the request signal may be a request to send (RTS) signal, the approval may be a clear to send (CTS) signal, and/or the instruction signal may be a request to send (RTS) signal, a clear to send (CTS) signal, or an (UL or DL) allocation signal (e.g. an UL trigger).

In some embodiments, the method may further comprise avoiding downlink transmissions in the first frequency interval during the upcoming downlink transmission by the second wireless communication access point.

Avoiding (uplink or downlink) transmissions in the first frequency interval may comprise avoiding transmissions in the second frequency interval according to some embodiments. In some embodiments, avoiding transmissions in the first frequency interval may comprise avoiding transmissions in the first frequency interval only and allowing transmissions in parts of the second frequency interval that have no overlap with the first frequency interval.

In some embodiments, the method may further comprise transmitting (to the first wireless communicator station) an acknowledgement signal responsive to receiving the indication signal. The acknowledgement signal may, for example, be a clear to send (CTS) signal. The acknowledgement signal may, according to some embodiments, be for triggering (at the first wireless communication station) transmission of an approval signal (to the second wireless communication access point) approving the upcoming downlink transmission.

In some embodiments, the indication signal transmitted by the first wireless communication station is also an approval signal (to the second wireless communication access point) approving the upcoming downlink transmission.

A second aspect is a method of a first wireless communication station for mitigating interference caused to the first wireless communication station by one or more second wireless communication stations. The one or more second wireless communication stations are served by a first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The method comprises receiving (from the second wireless communication access point) a request signal requesting approval for an upcoming downlink transmission by the second wireless communication access point intended for the first wireless communication station.

The method also comprises transmitting (to the first wireless communication access point) an indication signal indicative of the upcoming downlink transmission by the second wireless communication access point. Transmission of the indication signal is for triggering transmission (by the first wireless communication access point to the one or more second wireless communication stations) of an instruction signal inferring the one or more second wireless communication stations to avoid uplink transmissions in the first frequency interval during the upcoming downlink transmission by the second wireless communication access point.

In some embodiments, the method may further comprise receiving (from the first wireless communicator access point) an acknowledgement signal responsive to transmitting the indication signal. The method may, according to some embodiments, further comprise (responsive to receiving the acknowledgement signal) transmitting an approval signal to the second wireless communication access point, approving the upcoming downlink transmission.

In some embodiments, the indication signal may also be an approval signal to the second wireless communication access point, approving the upcoming downlink transmission.

A third aspect is an arrangement for a first wireless communication access point for mitigating interference caused to a first wireless communication station by one or more second wireless communication stations. The one or more second wireless communication stations are served by the first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The arrangement comprises a controller adapted to cause reception (from the first wireless communication station) of an indication signal indicative of an upcoming downlink transmission by the second wireless communication access point intended for the first wireless communication station. Transmission of the indication signal by the first wireless communication station was triggered by reception at the first wireless communication station of a request signal, from the second wireless communication access point, requesting approval for the upcoming downlink transmission. The controller is also adapted to cause transmission (to the one or more second wireless communication stations) of an instruction signal inferring the one or more second wireless communication stations to avoid uplink transmissions in the first frequency interval during the upcoming downlink transmission by the second wireless communication access point.

A fourth aspect is an arrangement for a first wireless communication station for mitigating interference caused to the first wireless communication station by one or more second wireless communication stations. The one or more second wireless communication stations are served by a first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The arrangement comprising a controller adapted to cause reception (from the second wireless communication access point) of a request signal requesting approval for an upcoming downlink transmission by the second wireless communication access point intended for the first wireless communication station. The controller is also adapted to cause transmission (to the first wireless communication access point) of an indication signal indicative of the upcoming downlink transmission by the second wireless communication access point. The transmission of the indication signal is for triggering transmission (by the first wireless communication access point to the one or more second wireless communication stations) of an instruction signal inferring the one or more second wireless communication stations to avoid uplink transmissions in the first frequency interval during the upcoming downlink transmission by the second wireless communication access point.

A fifth aspect is a method of a wireless communication node for mitigating interference caused to a first wireless communication station by one or more second wireless communication stations. The one or more second wireless communication stations are served by a first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The method comprises transmitting (in preparation for an upcoming downlink transmission by the second wireless communication access point intended for the first wireless communication station) an assignment signal to one or more third wireless communication stations served by the second wireless communication access point and adapted to communicate using the second frequency interval. The assignment signal comprises an uplink transmission duration indication that extends over the upcoming downlink transmission by the second wireless communication access point. The assignment signal is adapted to cause the one or more third wireless communication stations to transmit respective uplink preambles based on the uplink transmission duration indication and to avoid uplink transmissions during the upcoming downlink transmission by the second wireless communication access point.

In some embodiments, the wireless communication node may be the second wireless communication access point.

The assignment signal may be an uplink trigger signal according to some embodiments.

The method may, in some embodiments, further comprise selecting the one or more third wireless communication stations among wireless communication stations served by the second wireless communication access point. In some embodiments, the method may further comprise acquiring position estimates for wireless communication stations served by the second wireless communication access point, and the one or more third wireless communication stations may be selected as wireless communication stations having a distance to the first wireless communication station that is less than a distance threshold value. In some embodiments, the method may further comprise dividing a cell of the second wireless communication access point into sectors, and the one or more third wireless communication stations may be selected as wireless communication stations being in a same sector as the first wireless communication station. In some embodiments, the method may further comprise receiving (from wireless communication stations served by the second wireless communication access point) signal strength measurement reports related to the first wireless communication station, and the one or more third wireless communication stations may be selected as wireless communication stations reporting a signal strength that is greater than a signal strength threshold value.

In some embodiments, the wireless communication node may be the first wireless communication station.

The method may, according to some embodiments, further comprise receiving a request signal (from the second wireless communication access point) requesting approval for the upcoming downlink transmission, and the assignment signal may also be an approval signal to the second wireless communication access point, approving the upcoming downlink transmission.

A sixth aspect is a method of a third wireless communication station for mitigating interference caused to a first wireless communication station by one or more second wireless communication stations. The one or more second wireless communication stations are served by a first wireless communication access point and the first and third wireless communication stations are served by a second (neighboring) wireless communication access point. The first wireless communication station is adapted to communicate using a first frequency interval and the third and one or more second wireless communication stations are adapted to communicate using a second frequency interval, the first frequency interval being smaller than the second frequency interval and comprised within the second frequency interval.

The method comprises monitoring a signal strength related to the first wireless communication station, and receiving (in preparation for an upcoming downlink transmission by the second wireless communication access point intended for the first wireless communication station) an assignment signal comprising an uplink transmission duration indication that extends over the upcoming downlink transmission by the second wireless communication access point.

The method also comprises (if the signal strength related to the first wireless communication station is greater than a signal strength threshold value) transmitting an uplink preamble based on the uplink transmission duration indication and avoiding uplink transmissions during the upcoming downlink transmission by the second wireless communication access point.

A seventh aspect is an arrangement for a wireless communication node for mitigating interference caused to a first wireless communication station by one or more second wireless communication stations. The one or more second wireless communication stations are served by a first wireless communication access point and the first wireless communication station is served by a second (neighboring) wireless communication access point. The first wireless communication station is adapted to communicate using a first frequency interval and the one or more second wireless communication stations are adapted to communicate using a second frequency interval, the first frequency interval being smaller than the second frequency interval and comprised within the second frequency interval.

The arrangement comprises a controller adapted to cause transmission (in preparation for an upcoming downlink transmission by the second wireless communication access point intended for the first wireless communication station) of an assignment signal to one or more third wireless communication stations served by the second wireless communication access point and adapted to communicate using the second frequency interval. The assignment signal comprises an uplink transmission duration indication that extends over the upcoming downlink transmission by the second wireless communication access point, and the assignment signal is adapted to cause the one or more third wireless communication stations to transmit respective uplink preambles based on the uplink transmission duration indication and to avoid uplink transmissions during the upcoming downlink transmission by the second wireless communication access point.

In different embodiments, the wireless communication node may be the second wireless communication access point or the first wireless communication station.

An eighth aspect is an arrangement for a third wireless communication station for mitigating interference caused to a first wireless communication station by one or more second wireless communication stations. The one or more second wireless communication stations are served by a first wireless communication access point and the first and third wireless communication stations are served by a second (neighboring) wireless communication access point. The first wireless communication station is adapted to communicate using a first frequency interval and the third and one or more second wireless communication stations are adapted to communicate using a second frequency interval, the first frequency interval being smaller than the second frequency interval and comprised within the second frequency interval.

The arrangement comprises a controller adapted to cause monitoring of a signal strength related to the first wireless communication station and reception (in preparation for an upcoming downlink transmission by the second wireless communication access point intended for the first wireless communication station) of an assignment signal comprising an uplink transmission duration indication that extends over the upcoming downlink transmission by the second wireless communication access point. The controller is also adapted to cause (if the signal strength related to the first wireless communication station is greater than a signal strength threshold value) transmission of an uplink preamble based on the uplink transmission duration indication and avoiding of uplink transmissions during the upcoming downlink transmission by the second wireless communication access point.

A ninth aspect is a computer program product comprising a computer readable medium, having thereon a computer program comprising program instructions, the computer program being loadable into a data-processing unit and adapted to cause execution of the method according to any of the first, second, fifth and sixth aspects when the computer program is run by the data-processing unit.

A tenth aspect is a wireless communication station comprising the arrangement according to any of the fourth, seventh and eighth aspects.

An eleventh aspect is a wireless communication access point comprising the arrangement according to any of the third and seventh aspects.

In some embodiments, any of the above aspects may additionally have features identical with or corresponding to any of the various features as explained above for any of the other aspects.

An advantage of some embodiments is that there is provided mitigation of interference in relation to narrowband devices in wideband environments.

Another advantage of some embodiments is that wideband devices, which are close to the narrowband device and served by a neighboring access point, are impelled to avoid communication during communication of the narrowband device; at least in frequencies used by the narrowband device.

Yet another advantage of some embodiments is that downlink transmissions to the narrowband device are protected from interference.

BRIEF DESCRIPTION OF THE DRAWINGS

Further objects, features and advantages will appear from the following detailed description of embodiments, with reference being made to the accompanying drawings, in which:

FIGS. 3-7 are combined flowcharts and signaling diagrams illustrating example method steps and signaling according to some embodiments;

FIGS. 8-9 are schematic block diagrams illustrating example arrangements according to some embodiments; and FIG. 10 is a schematic drawing illustrating a computer readable medium according to some embodiments.

DETAILED DESCRIPTION

In the following, embodiments will be described that provide interference mitigation in relation to narrowband devices in wideband environments. In some embodiments, particular focus is on mitigating interference experienced by a narrowband device when receiving downlink communication. According to some embodiments, such interference may be mitigated by application of signaling adapted to silence wideband devices that are close to the narrowband device and are served by a neighboring access point. Such signaling may be adapted to silence the relevant wideband devices during (UL and/or DL) communication of the narrowband device, at least in frequencies used by the narrowband device.

A possible approach when considering using embodiments described herein is to first attempt narrowband communication without using the described interference mitigation techniques, and only applying one or more of the described interference mitigation techniques if this attempt fails (after one or several attempts).

Figure 1:
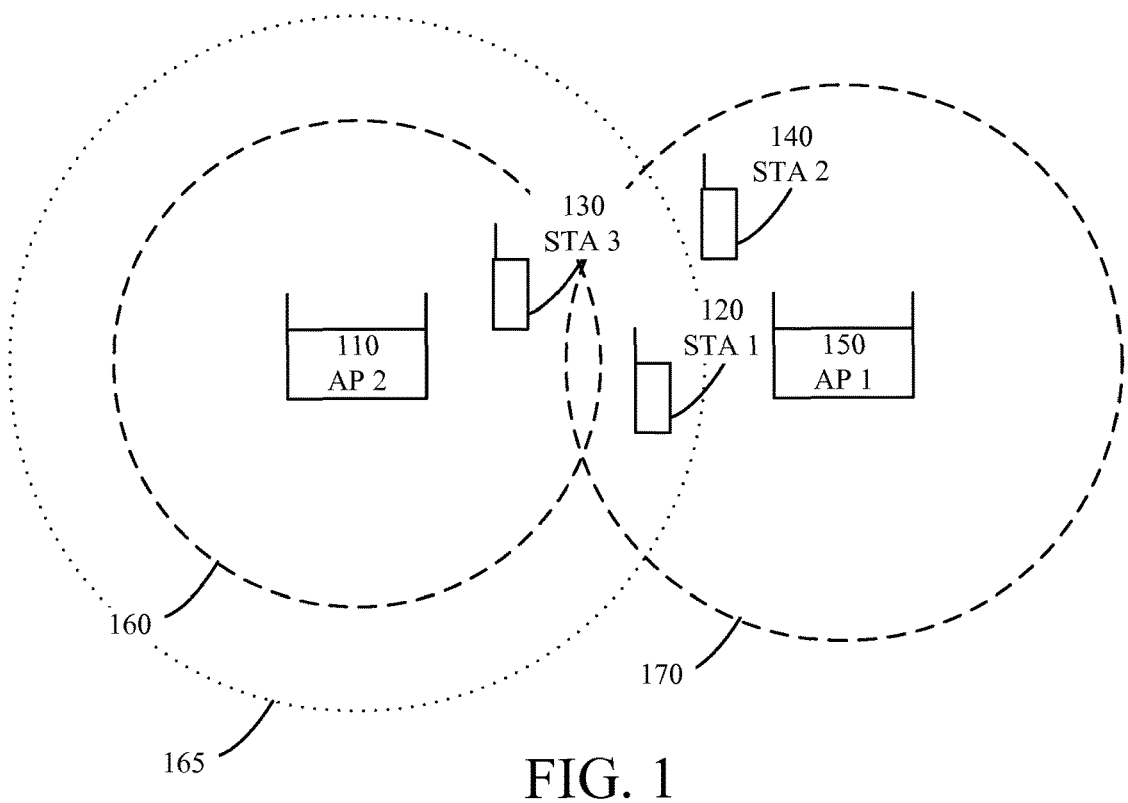
FIG. 1 is a schematic drawing illustrating a scenario where some embodiments may be applicable.

Another, alternative or additional, possible approach is to only apply one or more of the described interference mitigation techniques if there is a risk of experience problems related to hidden nodes. For example, STA 1 (see FIG. 1) may receive narrowband beacon signaling from AP 1 (neighboring AP). Based on this signaling, STA 1 may determine the risk of hidden nodes (e.g. using the signal strength of the beacon signal) and inform AP 2 (serving STA 1) accordingly.

FIG. 3-7 illustrate signaling and method steps according to various example embodiments for mitigating interference caused to a first wireless communication station (STA 1, compare with 120 of FIG. 1) 320, 420, 520, 620, 720 by a second wireless communication station (STA 2, compare with 140 of FIG. 1) 340, 440, 540, 640, 740.

The second wireless communication station is served by a first wireless communication access point (AP 1, compare with 150 of FIG. 1) 350, 450, 550, 650, 750 and the first wireless communication station is served by a second (neighboring) wireless communication access point (AP 2, compare with 110 of FIG. 1) 310, 410, 510, 610, 710, which also serves a third wireless communication station (STA 3, compare with 130 of FIG. 1) 330, 430, 530, 630, 730.

STA 1 is a narrowband device and STA 2 and STA 3 are wideband devices. Thus, STA 1 is adapted to communicate using a first (narrow) frequency interval only and STA 2 and STA 3 are adapted to communicate using a second (wide) frequency interval. The first frequency interval is smaller than the second frequency interval and is comprised within the second frequency interval. In some embodiments, STA 3 may be a combined wideband and narrowband device, being adapted to communicate using either of the first and second frequency intervals.

Downlink (narrowband) communication by AP 2 may refer to DL data from AP 2 to STA 1 or to a response (e.g. acknowledgement) to an UL transmission from STA 1 to AP 2. There are several ways to transmit downlink data from AP 2 to the NB STA 1. The data may be transmitted on a specific sub-band to the STA 1, may be scheduled together with WB STA:s in an OFDMA fashion, and/or may be scheduled together with the WB OFDMA acknowledgements.

Figure 3:
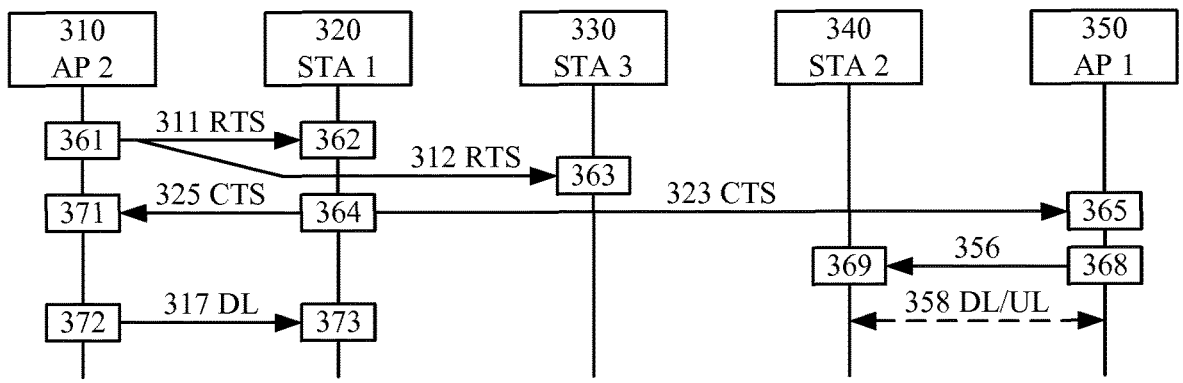
Figure 4:
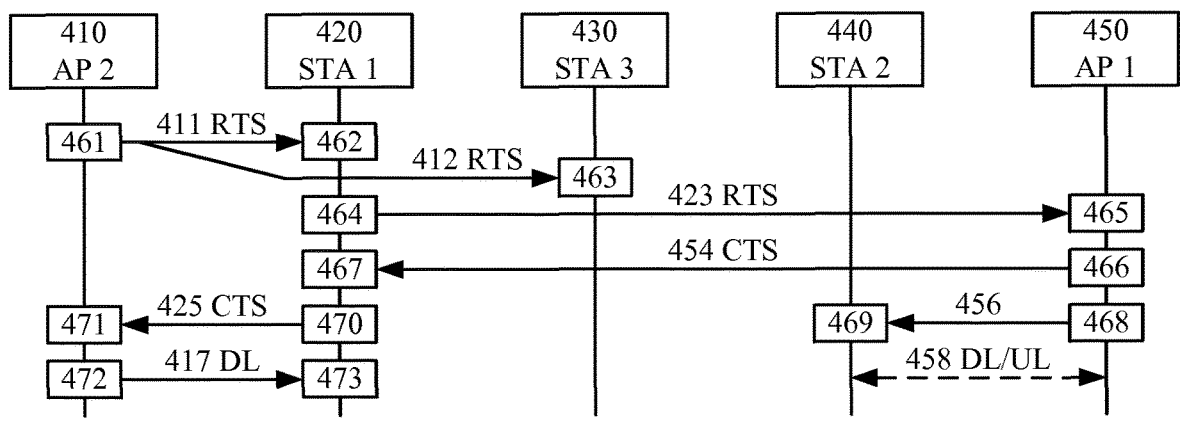

In FIGS. 3-4, AP 1 and AP 2 are both adapted to communicate using either of the first and second frequency intervals. STA 2 and STA 3 may be legacy devices (not adapted to communicate using the first frequency interval) or a devices adapted to communicate using either of the first and second frequency intervals.

FIG. 3 illustrates an example where AP 2 transmits (361) an RTS signal (311, 312) to STA 1, whereby AP 2 requests approval of upcoming DL communication (317) to be transmitted (372) by AP 2 and received (373) by STA 1. The RTS signal is received (362) by STA 1 which, in response thereto, transmits (364) a CTS signal (325, 323) to be received (371) by AP 2.

Figure 2:
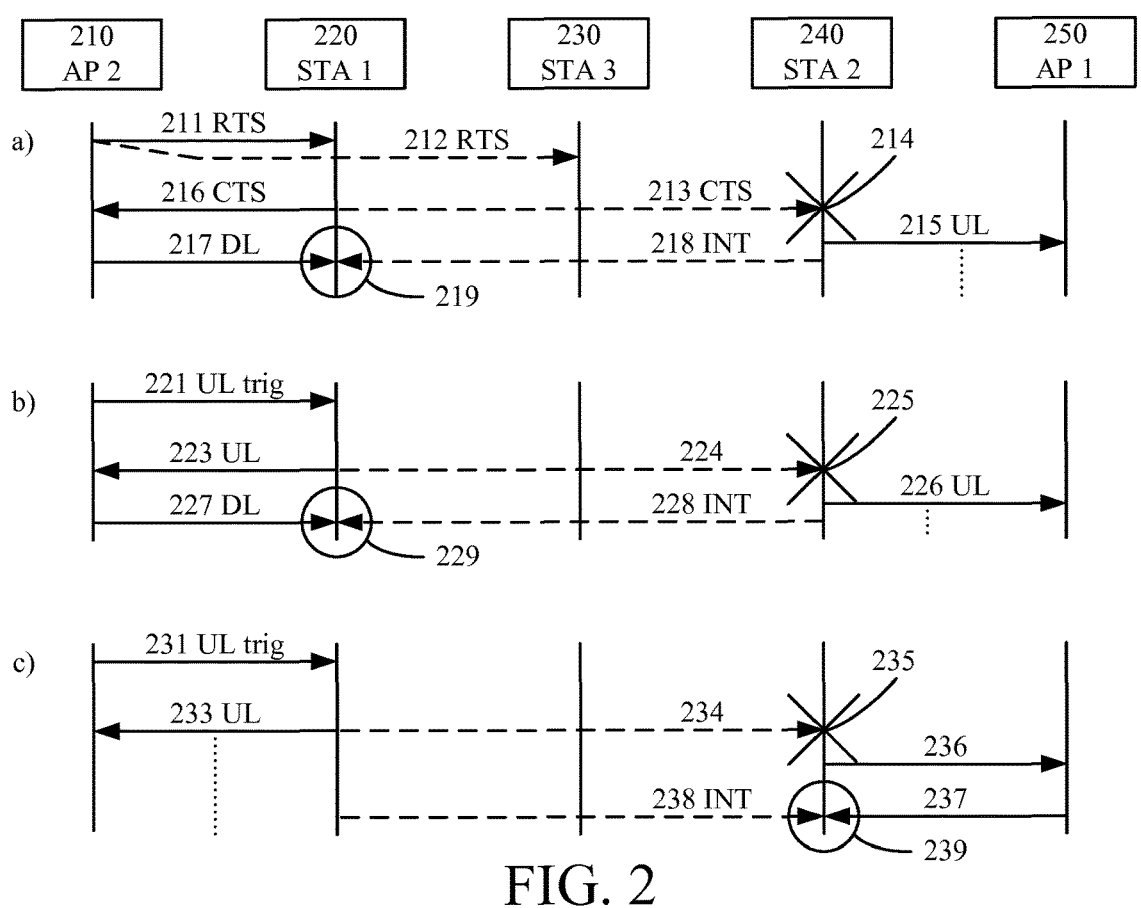
FIG. 2 is a combined flowchart and signaling diagram illustrating example scenarios where some embodiments may be applicable.

If the RTS signal (311, 312) is constructed so that it may be understood by both narrowband and wideband devices or if STA 3 is adapted to communicate using either of the first and second frequency intervals, STA 3 may be adequately silenced for frequencies used by STA 1 during the DL communication (317) in response to receiving (363) the RTS signal. These possibilities are not available for STA 2 since it is out of reach for AP 2 and since it is a legacy device. Furthermore, since the CTS signal (325, 323) is transmitted by the narrowband device STA 1, it is typically not understood by the wideband device STA 2. Therefore, STA 2 may cause interference to STA 1 in relation to the upcoming DL communication (317) as exemplified in part a) of FIG. 2.

In FIG. 3, this problem is solved in that the CTS signal (325, 323) is received (365) by AP 1. This is typically possible when a hidden node problem in relation to STA 2 is prominent since STA 1 is then typically close to STA 2 served by AP 1.

In response to the reception (365), AP 1 transmits (368) an instruction signal (356) to be received (369) by STA 2. The instruction signal (356) infers STA 2 to avoid UL and/or DL communication (358) in the first frequency interval during the upcoming DL communication (317) by AP 2. In particular, avoiding UL transmissions by STA 2 may mitigate interference to reception at STA 1 of DL communication (317) and avoiding DL transmissions to STA 2 may avoid that such DL transmissions are interfered by a response by STA 1 to DL communication (317).

In some embodiments, the instruction signal infers STA 2 to be completely silent during DL communication (317). Alternatively, the instruction signal only infers STA 2 to be silent in the frequency interval used by STA 1. The instruction signal may, for example be a RTS signal or a CTS signal. Alternatively or additionally, the instruction signal may comprise allocation, triggering, or the like for STA 2 to transmit and/or receive UL/DL communication (358) in parts of the second frequency interval that are not used by STA 1.

One potential problem with the approach of FIG. 3 is that, if other communication is ongoing in relation the neighboring cell, AP 1 may not receive the CTS and/or may not be able to transmit the instruction signal. If so, the DL communication will still be susceptible to interference from STA 2. One possible way to address this problem is exemplified in FIG. 4.

In analogy with FIG. 3, FIG. 4 illustrates an example where AP 2 transmits (461) an RTS signal (411, 412) to STA 1, whereby AP 2 requests approval of upcoming DL communication (417) to be transmitted (472) by AP 2 and received (473) by STA 1. As in the example of FIG. 3, STA 3 may be adequately silenced for frequencies used by STA 1 during the DL communication (417) in response to receiving (463) the RTS signal, while this is not possible for STA 2.

In FIG. 4, this problem is solved in that STA 1 transmits (464) another, narrowband, RTS signal (423) in response to receiving (462) the RTS signal (411, 412), and the narrowband RTS signal (423) is received (465) by AP 1. Preferably, STA 1 may perform carrier sensing before transmitting the narrowband RTS signal (423) to reduce the risk of AP 1 not receiving it and/or not being able to respond in time.

In response to the reception (465), AP 1 transmits (466) a CTS signal (454) which is received (467) by STA 1. The CTS signal (454) serves as an acknowledgement from AP 1 to STA 1 that AP 1 and the devices served by it (e.g. STA 2) will not cause interference in the first frequency interval during the DL communication (417). In response to receiving (467) the CTS signal (454), STA 1 transmits (470) another CTS signal (425) to be received (471) by AP 2. Typically, the durations in the RTS/CTS packets may be adjusted to include the additional time needed to reserve the channel, and all the packets exchanges may be separated by some suitable time, e.g. a SIFS (short inter frame space).

In response to the reception (465), AP 1 also transmits (468) an instruction signal (456) to be received (469) by STA 2. As in FIG. 3, the instruction signal (456) infers STA 2 to avoid UL and/or DL communication (458) in the first frequency interval during the upcoming DL communication (417) by AP 2.

In some embodiments, the instruction signal infers STA 2 to be completely silent during DL communication (417). Alternatively, the instruction signal only infers STA 2 to be silent in the frequency interval used by STA 1. The instruction signal may, for example be a RTS signal or a CTS signal. Alternatively or additionally, the instruction signal may comprise allocation, triggering, or the like for STA 2 to transmit and/or receive UL/DL communication (458) in parts of the second frequency interval that are not used by STA 1. For example, when transmitting the (narrowband) CTS signal (454), AP 1 may simultaneously transmit DL data or an UL trigger to STA 2 in relation to parts of the second frequency interval that are not used by STA 1.

Figure 5:
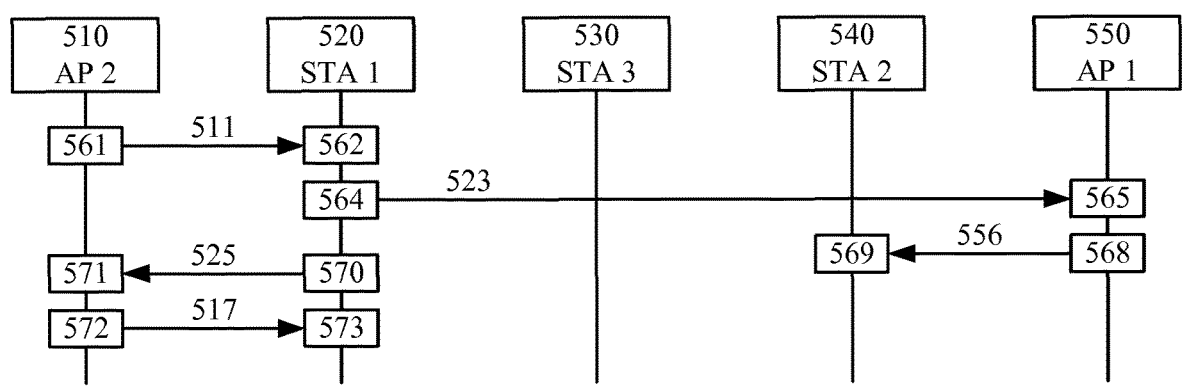

FIG. 5 illustrates an example which may be seen as a generalization of the examples of FIGS. 3 and 4. In FIG. 5, AP 2 transmits (561) a request signal (511, compare with 311 and 411) to STA 1, whereby AP 2 requests approval of upcoming DL communication (517, compare with 317 and 417) to be transmitted (572) by AP 2 and received (573) by STA 1.

The request signal is received (562) by STA 1 which, in response thereto, transmits (564) an indication signal (523, compare with 323 and 423) indicative of the upcoming DL communication (517) to be received (565) by AP 1. Transmission from STA 1 to AP 1 is typically possible when a hidden node problem in relation to STA 2 is prominent, since STA 1 is then typically close to STA 2, which is served by AP 1.

Also in response to receiving (562) the request signal, STA 1 transmits (570) an approval signal (525), which when received (571) by AP 2 triggers the DL communication (517). The approval signal (525) may coincide with the indication signal (523) or it may be a separate signal (e.g. transmitted in response to reception of an acknowledgement signal associated with the indication signal (523)).

In response to the reception (565) of the indication signal (523), AP 1 transmits (568) an instruction signal (556, compare with 356 and 456) to be received (569) by STA 2. The instruction signal (556) infers STA 2 to avoid UL and/or DL communication in the first frequency interval during the upcoming DL communication (517) by AP 2. In particular, avoiding UL transmissions by STA 2 may mitigate interference to reception at STA 1 of DL communication (517) and avoiding DL transmissions to STA 2 may avoid that such DL transmissions are interfered by a response by STA 1 to DL communication (517).

As explained above, the instruction signal may infer STA 2 to be completely silent during DL communication (517) may only infer STA 2 to be silent in the frequency interval used by STA 1.

In FIGS. 6-7, AP 2 is adapted to communicate using either of the first and second frequency intervals, while AP 1 may be a legacy AP (not adapted to communicate using the first frequency interval) or may be adapted to communicate using either of the first and second frequency intervals. STA 2 may be a legacy device or a device adapted to communicate using either of the first and second frequency intervals. STA 3 is adapted to communicate using either of the first and second frequency intervals.

FIG. 6 illustrates an example where there is an upcoming DL communication (617) to be transmitted (672) by AP 2 and received (673) by STA 1. In preparation for this, AP 2 transmits (661) an UL trigger signal (611) to STA 3. The UL trigger signal comprises an UL transmission duration indication that extends over the upcoming DL communication (617). In response to receiving (665) the UL trigger signal (611), STA 3 transmits (666) corresponding UL signals (634, 635, 636) to be received (667) by AP 2.

The UL signals (634, 635, 636) comprise an UL preamble based on the UL transmission duration indication. Nodes being able to receive the UL signals (634, 635, 636) will avoid communication during the indicated UL transmission duration, and thereby during the upcoming DL communication (617). Since STA 3 is a wideband device, the UL preamble will be understood by other wideband devices. Thus, provided that STA 2 and/or AP 1 are within reach of STA 3, their respective reception (668, 669) of the UL signals (634, 635, 636) will cause them to avoid communication during the upcoming DL communication (617). When a hidden node problem in relation to STA 2 is prominent for STA 1, STA 2 (and possibly AP 1) is typically within reach for the STA 3 being close to STA 1.

The UL trigger signal (611) may also instruct STA 3 to defer from UL transmission during a part of the indicated UL transmission duration that coincides with the upcoming DL communication (617). Thereby, the UL trigger signal and the corresponding UL preamble may cause one or more of STA 3, STA 2 and AP 1 to avoid UL and/or DL communication during the upcoming DL communication (617) by AP 2.

The avoidance by one or more of STA 3, STA 2 and AP 1 may be contained to the frequency interval used by STA 1. For example, the UL trigger may be for that frequency interval only or the UL trigger signal may instruct STA 3 to defer from UL transmission only in that frequency interval.

In other words, FIG. 6 illustrates an approach where AP 2 starts by transmitting a special UL trigger frame 611 that instructs one or more NB/WB capable devices (STA 3) to transmit in the uplink with an extended duration field. The NB/WB devices that do not have any uplink data may respond with only a WB preamble. Once the uplink transmissions by STA 3 are completed, AP 2 can transmit NB data to STA 1 which will be protected due to the extended duration filed.

There are different ways for the WB/NB capable devices to extend the duration of the uplink transmission. One way is to increase the length field (part of the signal field) in the physical preamble, possibly instructed so by AP 2. Another way is to increase the duration field in the MAC header. This is used to set the NAV and is part of the virtual carrier sensing.

FIG. 7 also illustrates an example where there is an upcoming DL communication (717) to be transmitted (772) by AP 2 and received (773) by STA 1. In preparation for this, AP 2 transmits (761) a form of RTS signal (711) to STA 1. In response to receiving (762) the RTS signal (711), STA 1 transmits a form of NB CTS signal (723, 722) to be received (764) by AP 2. Since STA 3 is adapted to communicate using either of the first and second frequency intervals, it is able to understand the CTS signal (723, 722) at reception (765).

In relation to the example of FIG. 7, it may be assumed that STA 1 and AP 2 have agreed on what NB channel to use beforehand and that AP 2 transmits the RTS with NB information on that specific channel. There are different ways for the STA 3 to derive the specific channel used by the STA 1. For example, the RTS may contain such information, or STA 3 may perform power estimation (in the imaginary dimension if applicable) to derive the information.

In response to receiving (765) the CTS signal (723, 722), STA 3 transmits (766) UL signals (734, 735, 736) for reception (767) by AP 2. The UL signals (734, 735, 736) comprise an UL preamble based on an UL transmission duration indication that extends over the upcoming DL communication (717), and possibly data. As explained in relation to FIG. 6, provided that STA 2 and/or AP 1 are within reach of STA 3, their respective reception (768, 769) of the UL signals (734, 735, 736) will cause them to avoid communication during the upcoming DL communication (717), and STA 3 may defer from UL transmission during a part of the indicated UL transmission duration that coincides with the upcoming DL communication (717).

A generalization of the examples in FIGS. 6-7 may be described as transmission (from either AP 2 or STA 1) of an assignment signal (e.g. 611, 722) to STA 3 in preparation for an upcoming DL communication (e.g. 617, 717) from AP 2 to STA 1. The assignment signal comprises an UL transmission duration indication that extends over the upcoming DL communication (e.g. 617, 717) and is adapted to cause STA 3 to transmit a corresponding UL preamble (e.g. 634, 635, 636, 734, 735, 736) and to avoid UL transmissions during the upcoming DL communication (e.g. 617, 717).

In some embodiments, STA 3 may be any wideband device served by AP 2. However, it may be preferable to only use wideband devices that are close to STA 1 for STA 3 purposes as those exemplified in relation to FIGS. 6-7. This is because the procedures of FIGS. 6-7 are most efficient if STA 3 is close to STA 1 and because using other wideband devices for STA 3 purposes may unnecessarily decrease capacity. For example, medium reuse in overlapping cells may be prevented or at least impaired, since devices might refrain from communication even when there is no actual risk of interfering with the NB downlink communication. Hence, it may be preferable to select one or more wideband devices served by AP 2 and close to STA 1 to perform the STA 3 procedures exemplified in FIGS. 6-7.

The selection may, for example, be made by AP 2 and the assignment signal may be sent only to the selected devices (e.g. using an identifier for the relevant devices). The selection by AP 2 may be based on position estimates for devices (including STA 1 and STA 3) served by AP 2. Wideband devices having a distance to STA 1 that is less than a distance threshold value may be used for STA 3 purposes, for example. Alternatively or additionally, the selection by AP 2 may be based on a division into sectors of the coverage area served by AP 2. Wideband devices being in the same sector as STA 1 may be used for STA 3 purposes, for example. Yet alternatively or additionally, the selection by AP 2 may be based on STA 1 signal strength measurement reports from wideband devices served by AP 2. The devices monitor a received signal strength related to STA 1 and report to AP 2. Wideband devices receiving a signal strength from STA 1 that is greater than a signal strength threshold value may be used for STA 3 purposes, for example. The report may, for example, comprise an indication of the measured signal strength or an indication of whether or not the measured signal strength exceeds the signal strength threshold value. Signal strength may be measured in any suitable manner, e.g. signal-to-noise ratio or signal-to-interference ratio.

In some embodiments, the selection may be performed by each wideband device served by AP 2 determining whether or not it is to act as a STA 3. The device monitors a signal strength related to STA 1 and determines to act as a STA 3 if the signal strength is greater than a signal strength threshold value. The example of FIG. 7 may be seen as an example of this approach since the CTS 722 may typically be received which higher signal strength by devices close to STA 1 that by devices far from STA 1. In that context, the signal strength is that of the assignment signal itself.

Thus, FIGS. 6-7 exemplifies a method that protects downlink NB transmissions by using uplink transmissions from WB/NB capable devices (STA 3). The idea behind this approach is that if an uplink transmission from a WB/NB capable device is originating close to a NB device (STA 1), it might act similarly to a WB CTS in relation to the downlink NB transmission. As illustrated, this may be achieved by increasing the duration field of the uplink transmission to protect the subsequent downlink NB transmission. Thereby, the uplink transmission from STA 3 sets the NAV for STA 2 to remain silent during the upcoming DL communication to the NB device STA 1.

According to some embodiments, a method (or protocol) is provided for protection of NB transmissions in a wireless network supporting CSMA/CA and concurrent operation of NB and WB STA:s. An access point may determine the NB and WB STA:s that will be granted permission for UL transmission and may generate and transmit a management frame to signal information to WB STA:s and/or NB STA:s. The management frame may comprise identification of STA:s that are allowed to transmit in the UL, instructions to the WB STA:s to override the setting of CSMA/CA virtual carrier sensing information elements/fields present in the PHY and/or MAC header of the UL frames (e.g. NAV, duration/length fields), and implicit or explicit instructions to set the value of said elements/fields.

Determining the NB and WB STA:s that will be granted permission for UL transmission may be performed depending on which sector the STA:s belong to (e.g. only STA:s in the same sector allowed).c Determining the NB and WB STA:s that will be granted permission for UL transmission may be performed depending on the position of the WB STA:s relative to the NB STA:s.

In relation to the example in FIG. 6, the management frame may be a trigger frame, the instructions for setting the value of the virtual carrier sensing fields may include setting of an explicit value of the length and/or duration field as indicated in the trigger frame, and the value of the overridden length/duration field may depend on the duration of UL transmission of at least one NB STA.

In relation to the example in FIG. 7, the management frame may be a DL RTS frame, the instructions for setting the value of the virtual carrier sensing fields may include setting of an explicit value of the length and/or duration field as indicated in the DL RTS frame, the instructions for setting the value of the virtual carrier sensing fields may include indicating to the WB STA:s to listen for a NB CTS, and setting the value of the overridden length/duration field may be performed only when said NB CTS has been received and decoded.

It should be noted that approaches described above in relation to FIGS. 3-7 may be combined as suitable and that features mentioned for one example may be equally applicable to another example. It should also be noted that if no CTS signal is received when it is expected, the handshaking may be considered as failed and the planned Dl communication is typically postponed.

The RTS/CTS frame exchange is a mechanism used in IEEE802.11 in order to protect communication from problems related to hidden nodes. With the introduction of OFDMA (orthogonal frequency division multiple access) in IEEE802.11ax, a new frame exchange called MU-RTS/CTS (multi user RTS/CTS) has been proposed. In MU-RTS/CTS the access point sends a MU-RTS over all sub-channels of the OFDMA bandwidth applied and simultaneous CTS:s are transmitted by the STA:s associated with the respective sub-channels, thus filling up the OFDMA bandwidth applied. The MU-RTS provides time synchronization among STA:s. Then, DL communication by the access point comprises sending an OFDMA packet with a preamble extending over the OFDMA bandwidth applied and data to each of the STA:s in respective sub-channels.

Approaches to constructing a RTS signal so that it may be understood by both narrowband and wideband devices, as well as by devices adapted to operate in either broadband or narrowband mode, will now be exemplified. Similar considerations apply to CTS signals.

One way to transmit the RTS to both wideband (e.g. 20 MHz) and narrowband (e.g. 2 MHz) devices at the same time is to use Dual Carrier Modulation (DCM). For example, if binary phase shift keying (BPSK) is used to transmit the wideband RTS packet it is possible to transmit information such as the narrowband RTS in the unused imaginary dimension (i.e. rotated 90 degrees). The narrowband RTS can be repeated in frequency to cover the whole bandwidth. Such an approach accommodates wideband (e.g. legacy) devices as well as narrowband devices. However, the RTS power will be shared between the real and imaginary dimensions leading to a power loss for the wideband RTS compared to if no narrowband RTS was transmitted. If the narrowband RTS only needs to be transmitted in a specific sub-channel, the power loss may be decreased. Furthermore, a narrowband RTS can only carry a fraction of the bits of a wideband RTS and the encoding of information needs to be performed accordingly.

FIGS. 8-9 schematically illustrate example arrangements 800, 900 according to some embodiments. Each of the arrangements 800, 900 comprises a controller (CNTR) 820, 920, respectively. Furthermore, each of the arrangements 800, 900 is associated with a respective transceiver (TX/RX) 810, 910, which may or may not be comprises in the arrangement.

The arrangement 800 of FIG. 8 is for, and may be comprised in, a wireless communication access point such as any of AP 1 and AP 2 referred to above in relation to FIGS. 1-7. The arrangement may, for example, be adapted to cause execution of method steps performed by AP 1 and/or AP 2 in any of the approaches elaborated on above.

The arrangement 900 of FIG. 9 is for, and may be comprised in, a wireless communication station such as any of STA 1 and STA 3 referred to above in relation to FIGS. 1-7. The arrangement may, for example, be adapted to cause execution of method steps performed by STA 1 and/or STA 3 in any of the approaches elaborated on above.

Correspondingly to what has been explained above in relation to FIGS. 3-7, the arrangements 800, 900 represent embodiments for mitigating interference caused to a first wireless communication station (STA 1, e.g. comprising arrangement 900) by a second wireless communication station (STA 2). The second wireless communication station is served by a first wireless communication access point (AP 1, e.g. comprising arrangement 800) and the first wireless communication station is served by a second (neighboring) wireless communication access point (AP 2, e.g. comprising arrangement 800), which also serves a third wireless communication station (STA 3, e.g. comprising arrangement 900). Furthermore, STA 1 is a narrowband device and STA 2 and STA 3 are wideband devices, wherein STA 3 may be a combined wideband and narrowband device.

When the arrangement 800 is for a first wireless communication access point (AP 1), the controller 820 may be adapted to cause reception (by the transceiver 810) of an indication signal indicative of an upcoming DL transmission by the second wireless communication access point (AP 2) intended for the first wireless communication station (compare with steps 365, 465, 565 of FIGS. 3-5). Transmission of the indication signal by the first wireless communication station (STA 1) may be triggered by reception at the first wireless communication station of a request signal, from the second wireless communication access point (AP 2), requesting approval for the upcoming DL transmission. The controller 820 may also be adapted to cause transmission (by the transceiver 810) to one or more second wireless communication stations (STA 2) of an instruction signal (compare with steps 368, 468, 568 of FIGS. 3-5). The instruction signal may be adapted to infer the one or more second wireless communication stations to avoid UL transmissions during the upcoming DL transmission, at least in the frequency interval used by the first wireless communication station. In some embodiments, the controller 820 may also be adapted to cause transmission (by the transceiver 810) to the first wireless communicator station of an acknowledgement signal (compare with step 466 of FIG. 4).

When the arrangement 800 is for a second wireless communication access point (AP 2), the controller 820 may be adapted to cause transmission (by transceiver 810) of an assignment signal to one or more third wireless communication stations (STA 3) in preparation for an upcoming DL transmission by the second wireless communication access point intended for the first wireless communication station (compare with step 661 or FIG. 6). The assignment signal (e.g. an UL trigger signal) may comprise an uplink transmission duration indication that extends over the upcoming DL transmission and may be adapted to cause the one or more third wireless communication stations to transmit respective uplink preambles based on the uplink transmission duration indication and to avoid uplink transmissions during the upcoming DL transmission, at least in the frequency interval used by the first wireless communication station. The controller may be further adapted to cause selection (e.g. by a selector (SEL) 821) of the one or more third wireless communication stations among wireless communication stations served by the second wireless communication access point. As elaborated in connection to FIGS. 6 and 7, the selection may be based on one or more of:

position estimates for wireless communication stations served by the second wireless communication access point, and comparisons of distances between wireless communication stations to a threshold value, sectoring of the cell of the second wireless communication access point, and grouping of wireless communication stations belonging to the same sector, and signal strength measurement reports from wireless communication stations served by the second wireless communication access point related to the first wireless communication station, and comparisons of the signal strengths to a threshold value.

Depending on the selection approach, the selector 821 may comprise appropriate sub-units such as a comparator, a distance calculator, a memory or register, etc.

Of course, the arrangement 800 may be for both first and second wireless communication access points. Then, the controller 820 may be adapted to cause a combination of the actions described above.

When the arrangement 900 is for a first wireless communication station (STA 1), the controller 920 may be adapted to cause reception (by the transceiver 910) from the second wireless communication access point (AP 2) of a request signal (compare with steps 362, 462, 562 of FIGS. 3-5). The request signal may request approval for an upcoming DL transmission by the second wireless communication access point intended for the first wireless communication station. The controller 920 may also be adapted to cause transmission (by the transceiver 910) to the first wireless communication access point (AP 1) of an indication signal (compare with steps 364, 464, 564 of FIGS. 3-5). The indication signal may be indicative of the upcoming DL transmission and may be for triggering transmission, by the first wireless communication access point to the one or more second wireless communication stations, of an instruction signal as elaborated in above. The controller 920 may also be adapted to cause reception (by the transceiver 910) of an acknowledgement signal the indication signal from the first wireless communicator access point (compare with step 467 of FIG. 4). Furthermore, the controller 920 may be adapted to cause transmission (by the transceiver 910) of an approval signal to the second wireless communication access point, approving the upcoming DL transmission (compare with steps 364, 470, 570 of FIGS. 3-5).

Alternatively or additionally, when the arrangement 900 is for a first wireless communication station (STA 1), the controller 920 may be adapted to cause transmission (by transceiver 910) of an assignment signal to one or more third wireless communication stations (STA 3) in preparation for an upcoming DL transmission by the second wireless communication access point (AP 2) intended for the first wireless communication station (compare with step 763 or FIG. 7). The assignment signal (e.g. a CTS signal) may comprise an uplink transmission duration indication that extends over the upcoming DL transmission and may be adapted to cause the one or more third wireless communication stations to transmit respective uplink preambles based on the uplink transmission duration indication and to avoid uplink transmissions during the upcoming DL transmission, at least in the frequency interval used by the first wireless communication station. Transmission of the assignment signal may be in response to receiving (by transceiver 910) a request signal from the second wireless communication access point (compare with step 762 of FIG. 7). The request signal may be for requesting approval for the upcoming DL transmission. The assignment signal may also be an approval signal to the second wireless communication access point, approving the upcoming downlink transmission.

When the arrangement 900 is for a third wireless communication station (STA 3), the controller 920 may be adapted to cause monitoring (e.g. by a monitor (MON) 921) of a signal strength related to the first wireless communication station (STAT). The signal strength may be reported to AP 2 for use in selection of STA 3 by AP 2. Alternatively or additionally, the signal strength may be compared (e.g. by comparator (COMP) 922) to a threshold value for autonomous determination of whether or not to act as a STA 3. The controller may also be adapted to cause reception (by transceiver 910) of an assignment signal in preparation for an upcoming DL transmission by the second wireless communication access point (AP 2) intended for the first wireless communication station (compare with steps 665, 765 of FIGS. 6-7). The assignment signal may comprise an uplink transmission duration indication that extends over the upcoming DL transmission. In some embodiments, the monitoring of signal strength relates to the reception of the assignment signal, such that if the assignment signal is received (signal strength is high enough) it is determined to act as a STA 3.

If the signal strength related to the first wireless communication station is greater than a signal strength threshold value (which may be determined autonomously by the STA or by AP 2 based on reporting from the STA), the controller may be adapted to cause transmission (by transceiver 910) of an uplink preamble based on the uplink transmission duration indication and avoiding of uplink transmissions during the upcoming DL transmission.

Of course, the arrangement 900 may be for both first and third wireless communication stations. Then, the controller 920 may be adapted to cause a combination of the actions described above.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device, a wireless communication station, wireless communication access point or a wireless communication node) comprising arrangements/ circuitry/logic or performing methods according to any of the embodiments.

According to some embodiments, a computer program product comprises a computer readable medium such as, for example, a USB-stick, a plug-in card, an embedded drive, or a read-only memory (ROM) such as the CD-ROM 1000 illustrated in FIG. 10. The computer readable medium may have stored thereon a computer program comprising program instructions. The computer program may be loadable into a data-processing unit (PROC) 1020, which may, for example, be comprised in a wireless communication station or a wireless communication access point 1010. When loaded into the data-processing unit, the computer program may be stored in a memory (MEM) 1030 associated with or integral to the data-processing unit. According to some embodiments, the computer program may, when loaded into and run by the data-processing unit, cause execution of method steps according to, for example, the methods shown in any of the FIGS. 3-7.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a first wireless communication access point for mitigating interference caused to a first wireless communication station by one or more second wireless communication stations,
    wherein the one or more second wireless communication stations are served by the first wireless communication access point and the first wireless communication station is served by a second wireless communication access point, the second and first wireless communication access points being neighboring wireless communication access points, and
    wherein the first wireless communication station is adapted to communicate using a first frequency interval and the one or more second wireless communication stations are adapted to communicate using a second frequency interval, the first frequency interval being smaller than the second frequency interval and comprised within the second frequency interval,
    the method comprising:
    receiving, from the first wireless communication station, an indication signal indicative of an upcoming downlink transmission by the second wireless communication access point intended for the first wireless communication station, wherein transmission of the indication signal by the first wireless communication station was triggered by reception at the first wireless communication station of a request signal, from the second wireless communication access point, requesting approval for the upcoming downlink transmission; and
    transmitting, to the one or more second wireless communication stations, an instruction signal inferring the one or more second wireless communication stations to avoid uplink transmissions in the first frequency interval during the upcoming downlink transmission by the second wireless communication access point.

2. The method of claim 1, the method further comprising avoiding downlink transmissions in the first frequency interval during the upcoming downlink transmission by the second wireless communication access point.

3. The method of claim 1, wherein avoiding transmissions in the first frequency interval comprises avoiding transmissions in the second frequency interval.

4. The method of claim 1, wherein avoiding transmissions in the first frequency interval comprises avoiding transmissions in the first frequency interval only and allowing transmissions in parts of the second frequency interval that have no overlap with the first frequency interval.

5. The method of claim 1, the method further comprising transmitting, to the first wireless communicator station, an acknowledgement signal responsive to receiving the indication signal.

6. The method of claim 5, wherein the acknowledgement signal is for triggering, at the first wireless communication station, transmission of an approval signal to the second wireless communication access point, approving the upcoming downlink transmission.

7. The method of claim 1, wherein the indication signal transmitted by the first wireless communication station is also an approval signal to the second wireless communication access point, approving the upcoming downlink transmission.

8. A method of a first wireless communication station for mitigating interference caused to the first wireless communication station by one or more second wireless communication stations,
   wherein the one or more second wireless communication stations are served by a first wireless communication access point and the first wireless communication station is served by a second wireless communication access point, the second and first wireless communication access points being neighboring wireless communication access points, and
   wherein the first wireless communication station is adapted to communicate using a first frequency interval and the one or more second wireless communication stations are adapted to communicate using a second frequency interval, the first frequency interval being smaller than the second frequency interval and comprised within the second frequency interval,
   the method comprising:
   receiving, from the second wireless communication access point, a request signal requesting approval for an upcoming downlink transmission by the second wireless communication access point intended for the first wireless communication station; and
   transmitting, to the first wireless communication access point, an indication signal indicative of the upcoming downlink transmission by the second wireless communication access point, wherein transmission of the indication signal is for triggering transmission, by the first wireless communication access point to the one or more second wireless communication stations, of an instruction signal inferring the one or more second wireless communication stations to avoid uplink transmissions in the first frequency interval during the upcoming downlink transmission by the second wireless communication access point.

9. The method of claim 8, the method further comprising receiving, from the first wireless communicator access point, an acknowledgement signal responsive to transmitting the indication signal.

10. The method of claim 9, the method further comprising, responsive to receiving the acknowledgement signal, transmitting an approval signal to the second wireless communication access point, approving the upcoming downlink transmission.

11. The method of claim 8, wherein the indication signal is also an approval signal to the second wireless communication access point, approving the upcoming downlink transmission.

12. A method of a wireless communication node, for mitigating interference caused to a first wireless communication station by one or more second wireless communication stations,
   wherein the one or more second wireless communication stations are served by a first wireless communication access point and the first wireless communication station is served by a second wireless communication access point, the second and first wireless communication access points being neighboring wireless communication access points, and
   wherein the first wireless communication station is adapted to communicate using a first frequency interval and the one or more second wireless communication stations are adapted to communicate using a second frequency interval, the first frequency interval being smaller than the second frequency interval and comprised within the second frequency interval,
   the method comprising:
   transmitting, in preparation for an upcoming downlink transmission by the second wireless communication access point intended for the first wireless communication station, an assignment signal to one or more third wireless communication stations served by the second wireless communication access point and adapted to communicate using the second frequency interval,
   wherein the assignment signal comprises an uplink transmission duration indication that extends over the upcoming downlink transmission by the second wireless communication access point, and
   wherein the assignment signal is adapted to cause the one or more third wireless communication stations to transmit respective uplink preambles based on the uplink transmission duration indication and to avoid uplink transmissions during the upcoming downlink transmission by the second wireless communication access point.

13. The method of claim 12, wherein the wireless communication node is the second wireless communication access point.

14. The method of claim 13, wherein the assignment signal is an uplink trigger signal.

15. The method of claim 13, the method further comprising selecting the one or more third wireless communication stations among wireless communication stations served by the second wireless communication access point.

16. The method of claim 15, the method further comprising acquiring position estimates for wireless communication stations served by the second wireless communication access point, and wherein the one or more third wireless communication stations are selected as wireless communication stations having a distance to the first wireless communication station that is less than a distance threshold value.

17. The method of claim 15, the method further comprising dividing a cell of the second wireless communication access point into sectors, and wherein the one or more third wireless communication stations are selected as wireless communication stations being in a same sector as the first wireless communication station.

18. The method of claim 15, the method further comprising receiving, from wireless communication stations served by the second wireless communication access point, signal strength measurement reports related to the first wireless communication station, and wherein the one or more third wireless communication stations are selected as wireless communication stations reporting a signal strength that is greater than a signal strength threshold value.

19. The method of claim 14, wherein the wireless communication node is the first wireless communication station.

20. The method of claim 19, the method further comprising receiving a request signal, from the second wireless communication access point, requesting approval for the upcoming downlink transmission, and wherein the assignment signal is also an approval signal to the second wireless communication access point, approving the upcoming downlink transmission.

21. A method of a third wireless communication station, for mitigating interference caused to a first wireless communication station by one or more second wireless communication stations,
- wherein the one or more second wireless communication stations are served by a first wireless communication access point and the first and third wireless communication stations are served by a second wireless communication access point, the second and first wireless communication access points being neighboring wireless communication access points, and
- wherein the first wireless communication station is adapted to communicate using a first frequency interval and the third and one or more second wireless communication stations are adapted to communicate using a second frequency interval, the first frequency interval being smaller than the second frequency interval and comprised within the second frequency interval, the method comprising:
- monitoring a signal strength related to the first wireless communication station;
- receiving, in preparation for an upcoming downlink transmission by the second wireless communication access point intended for the first wireless communication station, an assignment signal comprising an uplink transmission duration indication that extends over the upcoming downlink transmission by the second wireless communication access point; and
- if the signal strength related to the first wireless communication station is greater than a signal strength threshold value, transmitting an uplink preamble based on the uplink transmission duration indication and avoiding uplink transmissions during the upcoming downlink transmission by the second wireless communication access point.

* * * * *